(12) United States Patent
Itabashi et al.

(10) Patent No.: US 9,619,000 B2
(45) Date of Patent: Apr. 11, 2017

(54) BOARD, BOARD APPARATUS AND METHOD FOR INTERCONNECTION OF BOARDS

(71) Applicant: NEC Corporation, Minato-ku, Tokyo (JP)

(72) Inventors: Noriyuki Itabashi, Tokyo (JP); Shingo Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/891,408

(22) PCT Filed: May 14, 2014

(86) PCT No.: PCT/JP2014/062870
§ 371 (c)(1),
(2) Date: Nov. 16, 2015

(87) PCT Pub. No.: WO2014/185462
PCT Pub. Date: Nov. 20, 2014

(65) Prior Publication Data
US 2016/0282923 A1   Sep. 29, 2016

(30) Foreign Application Priority Data

May 17, 2013   (JP) .................................. 2013-105356

(51) Int. Cl.
*G06F 3/00* (2006.01)
*G06F 1/32* (2006.01)
(Continued)

(52) U.S. Cl.
CPC .............. *G06F 1/3212* (2013.01); *G06F 3/00* (2013.01); *G06F 13/40* (2013.01);
(Continued)

(58) Field of Classification Search
CPC .......... G06F 1/3212; G06F 3/00; G06F 13/40; H01L 23/5382; H04L 9/3093; H04L 63/0442
See application file for complete search history.

(56) References Cited

U.S. PATENT DOCUMENTS

| 5,130,894 A | * | 7/1992 | Miller | ................. H01L 23/5385 257/E23.172 |
| 5,440,181 A | * | 8/1995 | Gruender, Jr. | ......... H05K 1/029 307/156 |

(Continued)

FOREIGN PATENT DOCUMENTS

| JP | S62-202598 A | 9/1987 |
| JP | H10-228765 A | 8/1998 |

(Continued)

OTHER PUBLICATIONS

International Search Report for PCT Application No. PCT/JP2014/062870, mailed on Jul. 1, 2014.
"Linear Technology", 2011, Linear Technology Corporation, Japan.

*Primary Examiner* — Jaweed A Abbaszadeh
*Assistant Examiner* — Gary Collins

(57) ABSTRACT

Disclosed is a board including a semiconductor device including a first terminal to receive a signal that sets a functionality of the device, a second terminal to supply a first value and a third terminal to supply a second value, a first connection member connected to the first to third terminals of the semiconductor device, and a second connection member adapted to be connected to the first connection member provided on a counterpart board, with at least two terminals of the second connection member connected together via a first connection circuit, wherein the first connection member of the board is connected to the second connection member of another counterpart board.

10 Claims, 10 Drawing Sheets

(51) Int. Cl.
  *G06F 13/40* (2006.01)
  *H04L 9/30* (2006.01)
  *H01L 23/538* (2006.01)
  *H04L 29/06* (2006.01)
  *H05K 1/02* (2006.01)
  *H05K 1/14* (2006.01)

(52) U.S. Cl.
  CPC ........ H01L 23/5382 (2013.01); H04L 9/3093 (2013.01); H04L 63/0442 (2013.01); *H01L 2924/0002* (2013.01); *H04L 2209/24* (2013.01); *H05K 1/029* (2013.01); *H05K 1/142* (2013.01); *H05K 2201/10037* (2013.01); *H05K 2201/10212* (2013.01)

(56) References Cited

U.S. PATENT DOCUMENTS

| | | | | |
|---|---|---|---|---|
| 5,793,998 A | * | 8/1998 | Copeland | H05K 1/144 361/748 |
| 6,075,704 A | * | 6/2000 | Amberg | G06F 13/409 361/729 |
| 6,091,666 A | | 7/2000 | Arase et al. | |
| 6,416,333 B1 | * | 7/2002 | Hasegawa | G06F 13/409 361/785 |
| 7,748,992 B1 | * | 7/2010 | Wooley | G06F 13/409 439/660 |
| 2003/0128007 A1 | * | 7/2003 | Fujisaki | H02P 31/00 318/560 |
| 2005/0289269 A1 | * | 12/2005 | Nakayama | G06F 13/409 710/110 |
| 2007/0202371 A1 | * | 8/2007 | Takeda | G01R 31/3658 429/432 |
| 2008/0071934 A1 | * | 3/2008 | Zhao | G06F 15/7867 710/8 |
| 2008/0143543 A1 | * | 6/2008 | Vandensande | G01R 31/362 340/636.1 |
| 2008/0180106 A1 | * | 7/2008 | Gorbold | G01R 31/3658 324/434 |
| 2008/0228970 A1 | * | 9/2008 | Schneider | G06F 13/409 710/104 |
| 2009/0039915 A1 | * | 2/2009 | Ruckerbauer | G11C 5/02 326/38 |
| 2010/0280786 A1 | * | 11/2010 | Gorbold | G06F 13/4247 702/120 |
| 2011/0082955 A1 | * | 4/2011 | Wortham | G06F 13/4256 710/110 |
| 2012/0068360 A1 | * | 3/2012 | Best | H01L 23/481 257/774 |
| 2013/0019118 A1 | * | 1/2013 | Flippin | H01M 10/425 713/340 |
| 2014/0017912 A1 | * | 1/2014 | Ha | H01R 12/73 439/74 |
| 2014/0306662 A1 | * | 10/2014 | Kim | H02J 7/0016 320/118 |
| 2014/0322573 A1 | * | 10/2014 | Nishiwaki | G01R 31/3606 429/90 |
| 2015/0019771 A1 | * | 1/2015 | Greef | H01M 10/425 710/105 |
| 2015/0378960 A1 | * | 12/2015 | Huffman | G06F 13/4045 710/300 |
| 2016/0028128 A1 | * | 1/2016 | Limvorapun | H01M 10/4257 429/62 |

FOREIGN PATENT DOCUMENTS

| | | |
|---|---|---|
| JP | H11-040913 A | 2/1999 |
| JP | 2003-070161 A | 3/2003 |
| JP | 2006-276719 A | 10/2006 |
| JP | 2007-148540 A | 6/2007 |
| JP | 2007-295774 A | 11/2007 |
| JP | 2008-108833 A | 5/2008 |
| JP | 2009-009967 A | 1/2009 |
| JP | 2012-242357 A | 12/2012 |

* cited by examiner

BOARD, BOARD APPARATUS AND METHOD FOR INTERCONNECTION OF BOARDS

CROSS-REFERENCE TO RELATED APPLICATION

This is a national stage of International Application No. PCT/JP2014/062870 filed May 14, 2014, claiming priority based on Japanese Patent Application No. 2013-105356 filed May 17, 2013, the entire contents of which are incorporated herein by reference.

FIELD

This invention relates to a board(s), a board apparatus and a method of connecting the boards. More particularly, it relates to a board structure best fitted to a board on which a stackable semiconductor device is packaged, a board apparatus including a plurality of boards and a method for connecting the boards.

BACKGROUND

Recently, there is a tendency toward higher voltage for capacity enlargement in an electric storage system and a battery for mobility use, exploiting a secondary battery. For securing a higher voltage, an arrangement of a tandem connection of a plurality of batteries is used. As a semiconductor device (IC: integrated circuit) monitoring a voltage of a battery cell, there are currently produced various sorts of battery monitor ICs, each of which is able to measure the voltage of a plurality of tandem-connected batteries and to monitor an individual battery cell. This sort of IC has a function in which a plurality of ICs can be stacked in series in series in correspondence with the number of the batteries connected in series (see Non-Patent Literature 1). It is noted that the IC stack function corresponds to a daisy chain connection function for sequentially forwarding, e.g., command/data to respective neighboring ICs.

FIG. 10 schematically illustrates an example of a battery stack monitor IC 10 for multi-cells according to a related technique (see Non-Patent Literature 1). The IC 10 is connected to a plurality of cells connected in series (in the example of FIG. 10, 12 cells, though not limited thereto). Other 12-cells may be connected to an upper side and/or a lower side of the 12 cells. In case other 12-cell ICs are connected to each of the upper and lower sides of the 12-cell IC, a voltage of 12 cells×3=36 cells can be measured on a per cell basis by three ICs that are stack connected. Referring to FIG. 10, a multiplexer (MUX) 11 in the IC 10 selects a terminal pair (a positive electrode and a negative electrode) of a cell and an analog-to-digital converter (ADC) 12 converts a voltage of the selected cell to a digital signal. A digital signal output from the ADC 12 is transferred to a microprocessor (micro-computer), not shown, via a data bus (DATA) under control by a register control circuit (REGISTER AND CONTROL) 13. Command/data transmitted via the data bus (DATA) from the IC of a preceding stage are sent via the register control circuit 13 to a next following stage. In the example of FIG. 10, a MOSFET (a metal oxide semiconductor field effect transistor) discharge switch 14 is provided between the positive node and the negative of each battery cell, though not limited thereto. In case the cell voltage is measured by command setting from the microprocessor, as an example, the discharge switch 14, connected between the electrodes of the cell in question, is turned off (discharge switches of the upper as well as the lower sides of the cell in question are also turned off).

During a time of forwarding command or data, a chip select input pin (CSB1) of the IC10 is set to an activated state (e.g., LOW voltage), under control by a microcomputer, not shown. During this forwarding period, the command or data is sent from one stage to a following stage in synchronization with a clock signal. It is noted that, in the example shown in FIG. 10, the IC 10 buffers the chip select signal received from a chip select input pin (CSB1), in an inside of the IC 10, so as to output the so buffered signal at a chip select output pin (CSB0). The IC 10 also buffers the clock signal received from a clock input pin (CK1), in an inside of the IC 10, so as to output the so buffered clock signal at a clock output pin (CK0), thereby actuating the next stage IC. A positive power supply (V+) of the IC 10 is connected to a highest positive potential of the stacked cells (the positive potential of the topmost one of the stacked 12 cells), while a negative power supply (V−) is connected to the lowest negative potential of the stacked cells (the negative potential of the bottommost one of the 12 cells). The positive power supply (V+) of the IC 10 is connected to the negative power supply (V−) of the next stage IC, while the negative power supply (V−) of the IO 10 is connected to the positive power supply (V+) of the previous stage IC. TOS is a top setting pin of the stack (for example, TOS of the top device (IC) is at a HIGH voltage and TOS of each of the remaining devices (ICs) in the stack is at a LOW voltage). It is noted that the IC 10 may differentially input/output data on the data bus (DATA), for example, so that it is possible to provide a daisy chain connection among a plurality of ICs operating at respective different power supply potentials.

In the stackable ICs, it is necessary to effect functionality setting of each of the ICs stacked in order to send data of such as cell voltage that the IC acquired to e.g., a microcomputer.

The functionality setting of the ICs in many cases is by a hardware using an IC peripheral circuit. More specifically, a functionality setting pin of the IC is pulled up to a power supply voltage (VDD) or pulled down to a ground (GND) potential.

FIG. 7 is a diagram illustrating an example of a related technique relevant to the functional setting for the IC. Referring to FIG. 7, a plurality of stackable IC $1_1$ to IC $1_3$ and a microcomputer 2 are mounted on a board (circuit board) 3. IC $1_1$ to IC$1_3$ are of the same configuration and electrically connected in series. A microcomputer 2 is connected to the ICs $1_3$ to $1_1$ via signal lines $5_3$, $5_2$, $5_1$, respectively. Though not limited thereto, each of the ICs $1_1$ to $1_3$ may also be a battery stack monitor analogous to that shown in FIG. 10. In case each of the ICs $1_1$ to $1_3$ is a battery stack monitor shown in FIG. 10, the signal lines $5_3$, $5_2$, and $5_1$ may include signals, such as a clock, a ship select signal or data explained with reference to FIG. 10.

The IC $1_3$ that is connected to the microcomputer 2, is a master IC, with the other IC $1_3$ and IC $1_2$ being slave ICs. In the IC $1_3$, functioning as the master IC, a setting pin that sets the function of the IC $1_3$ and a power supply voltage (VDD) are connected together by a circuit (wiring) $4_3$. In the IC $1_3$ and IC $1_2$, functioning as slaves ICs, GND and the setting pins are connected together by circuits (wirings) $4_1$ and $4_2$, respectively. It is noted that, in case each of the IC $1_1$ to IC $1_3$ is a battery stack monitor IC of FIG. 10, VDD is a positive power supply voltage $V^+$ (positive potential of a top cell of the stacked 12 cells), while GND is a negative power supply voltage $V^−$ (negative potential of the bottom cell of the stacked 12 cells).

In place of mounting a plurality of stackable ICs $1_1$ to $1_3$ on one and the same board 3, as illustrated in FIG. 7, a plurality of stackable ICs may, in an alternative configuration, be mounted one by one on a plurality of different boards and connected together. For example, in an example configuration of FIG. 8, the ICs $1_1$ to $1_3$ are mounted on a plurality of boards $3_1$ to $3_3$ and connections of setting pins of the ICs $1_1$ to $1_3$ are changed over by switches $6_1$ to $6_3$. Or, as illustrated in FIG. 9, the design of boards 3A, 3B and 3C are changed in correspondence with respective functions.

In FIG. 8, a switch SW1 between GND and the setting pin of the IC $1_3$ is opened and a switch SW2 between VDD and the setting pin closed to set the setting pin at the VDD potential. In the IC $1_1$ and IC $1_2$, switches SW2 between VDD and the setting pins are opened and the switches SW1 between the setting pins and GND are closed to set the setting pin at the GND potential.

Patent Literature 1 discloses a configuration of a cell voltage measurement device in which a voltage of each of a plurality of cells stacked together may be measured accurately. In this configuration, a cell side terminal for measuring a voltage of each individual cell is provided at a connection member of each of the stacked cells, and each cell side terminal is connected to a terminal of a GND connection changeover switch within the cell voltage measurement device provided in association with the connection member.

Regarding connection of a plurality of boards, Patent Literature 2 discloses a configuration in which a plurality of board units each of which is mounted on a mother board provided with a common bus line taking charge of signal communication, and a connector is provided at a terminal end of a common bus line of each of the board units, with a bias board that connects connectors of two neighboring board units and a terminal resistor attached to the connector of one of the board units.

Patent Literature 1: JP Patent Kokai Publication No. JP2012-242357A

Patent Literature 2: JP Patent Kokai Publication No. JP-S62-202598A

Non-Patent Literature

Non-Patent Literature 1: LINEAR TECHNOLOGY, "Multi cell Battery Stack Monitor", LTC6803 Datasheet, Internet (retrieved on Apr. 2, 2013) (URL: http://cds.linear.com/docs/jp/datasheet/j680313fa.pdf)

SUMMARY

The following gives an analysis of the related techniques.

The above mentioned setting of the IC setting pins suffers certain problems in connection with errors in the setting and in the number of designing processes.

For example, when the configuration of FIG. 7 is used for a battery monitor, limitation is imposed on the number of cells connected to the IC. If it should become necessary to decrease the number of cells or to add cells, alteration need to be made beginning from a board design.

In the configuration of FIG. 8, it becomes necessary, after ICs have been connected, to individually set the switches SW1 and SW2 from one board to the next. Mistaken on/off setting of the switches SW1 and SW2 leads to a circuit malfunction. In addition, a board area will increase correspondingly to a space for switches.

In the configuration of FIG. 9, circuit design differs, for each of the boards 3A to 3C, depending on the function, thus increasing the number of design processes and raising a cost.

The present invention has been made in light of the above mentioned problems. It is an object of the present invention to provide a board, a board apparatus and a method of connecting boards together, according to which functionality setting of a semiconductor device mounted on the board may be facilitated to render it possible to reduce a possibility of mistaken setting as well as the number of design processes.

In one of several aspects of the present invention (aspect 1), there is provided a board comprising
a semiconductor device including:
at least a first terminal to receive a signal that sets a functionality of the semiconductor device;
a second terminal configured to supply a first value; and
a third terminal configured to supply a second value, the semiconductor device adapted to be connected in series;
a first connection member connected to the first to third terminals of the semiconductor device; and a second connection member adapted to be connected to the first connection member provided on a counterpart board, the second connection member including at least two terminals connected together via a first connection circuit, the first connection member of the board adapted to be connected to the second connection member provided on another counterpart board.

In another one of several aspects of the present invention (aspect 2), there is provided a board apparatus comprising at least first and second boards which are the boards according to the above mentioned aspect 1, wherein two terminals that are the first terminal and one of the second and third terminals of the semiconductor device on the first board, are connected together via the first connection member of the first board, the second connection member of the second board and the first connection circuit, wherein
the semiconductor device on the first board is set to a function corresponding to the first or second value supplied to the first terminal from the second or third terminal of the semiconductor device to which the first terminal is connected.

In still another one of several aspects of the present invention (aspect 3), there is provided a method for board connection comprising:
providing, in each of first to third boards, each board including a semiconductor device adapted for series connection, each semiconductor device including at least a first terminal to receive a signal that sets a function of the semiconductor device; a second terminal configured to supply a first value; and a third terminal configured to supply a second value,
a first connection member connected to the first to third terminals of the semiconductor device and a second connection member adapted to be connected to the first connection member of a counterpart board, connecting at least two terminals of the second connection member on the board;
connecting the first connection member of the first board to the second connection member of the second board; and
connecting the second connection member of the first board to the first connection member of the third board.

According to the present invention, setting of the functionality of the semiconductor device, mounted on a board, may be facilitated so as to reduce errors in setting or decrease the number of design steps.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

Figure 1:
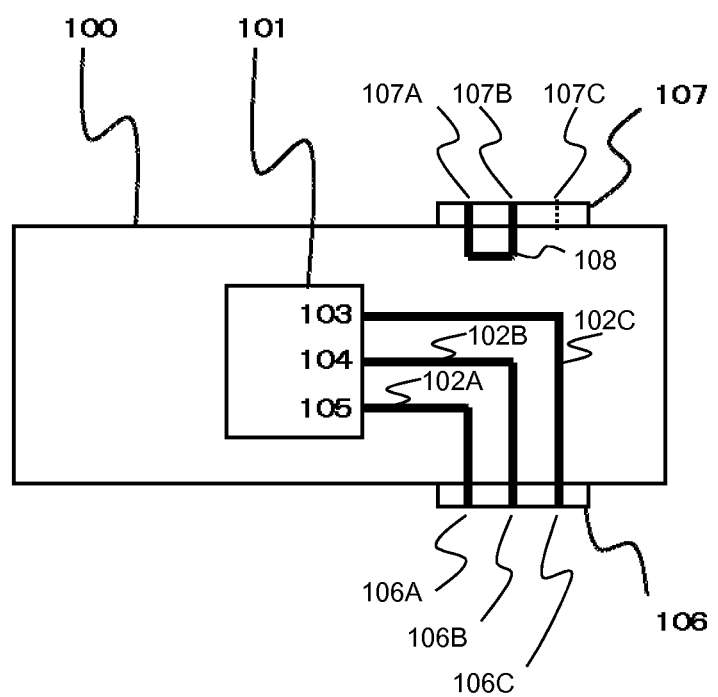
FIG. 1 is a diagram illustrating an exemplary embodiment 1 according to the present invention.
Figure 3:
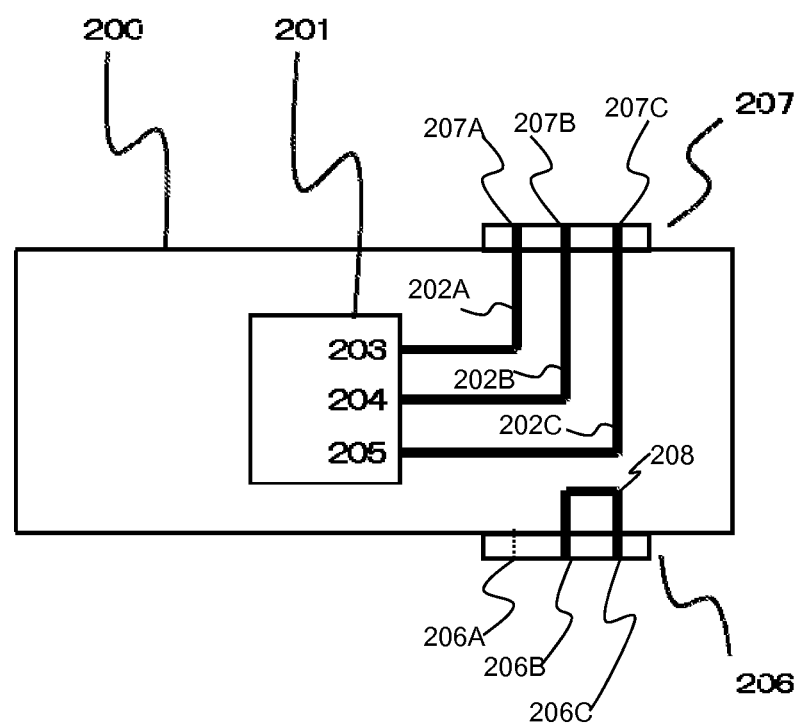
FIG. 3 is a diagram illustrating an exemplary embodiment 2 according to the present invention.

In any one of a plurality of preferred modes, there is provided a board (for example IC 100 of FIG. 1 or IC 200 of FIG. 3) including a semiconductor device (for example, IC 101 of FIG. 1 or IC 201 of FIG. 3) that includes at least a first terminal (for example, a pin 104 of FIG. 1 or a pin 204 of FIG. 3) to receive a signal that sets a functionality of the semiconductor device (for example, IC 101 of FIG. 1 or IC 201 of FIG. 3), a second terminal configured to supply a first value (for example, a pin 103 of FIG. 1 or a pin 203 of FIG. 3) and a third terminal configured to supply a second value (for example, a pin 105 of FIG. 1 or a pin 205 of FIG. 3). The semiconductor device (for example, IC 101 of FIG. 1 or IC 201 of FIG. 3) can be connected in series (can be stacked) with one or more semiconductor devices. The board also includes a first connection member (for example 106 of FIG. 1 or 207 of FIG. 3) connected to the first to third terminals of the semiconductor device (for example, IC101 of FIG. 1 or IC 201 of FIG. 3), a second connection member (for example, 107 of FIG. 1 or 206 of FIG. 3) adapted to be connected to the first connection member provided on another counterpart board, and a connection circuit (a first connection circuit) (for example 108 of FIG. 1 or 208 of FIG. 3) connecting at least two terminals (for example, 107A and 107B of FIG. 1 or 206B and 206C of FIG. 3) of the second connection member (for example, 107 of FIG. 1 or 206 of FIG. 3) together.

The first connection member (106 of FIG. 1 or 207 of FIG. 3) of the board (100 of FIG. 1 or 200 of FIG. 3), at the time of connection with a counterpart board that includes the same configuration as the second connection member (107 of FIG. 1, $107_4$ of FIG. 2 or 206 of FIG. 3) and the first connection circuit (108 of FIG. 1 or 208 of FIG. 3) of the board (100 of FIG. 1 or 200 of FIG. 3), is connected to the second connection member (107 of FIG. 1, $107_4$ of FIG. 2 or 206 of FIG. 3) provided on the counterpart board. The second connection member (107 of FIG. 1 or 206 of FIG. 3) of the board is connected, at the time of connection with another counterpart board that includes a first connection member of the same configuration as that of the board, is connected to the first connection member (106 of FIG. 1 or 207 of FIG. 3) of the another counterpart board.

In another one of preferred modes of the present invention, the semiconductor device (for example, 301 of FIG. 5) includes, in addition to the first to third terminals (for example 306, 305, 304 of FIG. 5), a fourth terminal (for example, a pin 303 of FIG. 5) for receiving a signal that sets a functionality of the semiconductor device. The first connection member (for example 307 of FIG. 5) of the board (300 of FIG. 5) is connected to the first to third terminals (for example 306, 305, 304 of FIG. 5) of the semiconductor device (for example, 301 of FIG. 5). The first connection member (for example, 307 of FIG. 5) further includes at least two terminals (for example, 307D and 307F of FIG. 5). These at least two terminals (for example, 307D and 307F of FIG. 5) of the first connection member (for example, 307 of FIG. 5) are connected to at least two terminals of the second connection member of another board. The board (300 of FIG. 5) may include a second connection circuit (for example, 311 of FIG. 5) that connects the at least two terminals (for example 307D and 307F of FIG. 5) of the first connection member (307 of FIG. 5). The second connection member (for example 308 of FIG. 5) of the board (300 of FIG. 5) may further include terminals (for example, 308D, 308E, and 308F of FIG. 5) connected respectively to second to fourth terminals (for example 305, 304, 303 of FIG. 5) of the semiconductor device (301 of FIG. 5) mounted on the board (300 of FIG. 5), the terminals (for example, 308D, 308E, and 308F of FIG. 5) being other than the two terminals (for example, 308A and 308B of FIG. 5).

In one of preferred modes, there is provided a configuration comprising at least first and second boards (for example, $100_1$ and $100_2$ of FIG. 2 or $200_2$ and $200_1$ of FIG. 4), each of which is the above mentioned board. The semiconductor device ($101_1$ of FIG. 2 or $201_2$ of FIG. 4) of the first board (for example, $100_1$ of FIG. 2 or $200_2$ of FIG. 4) includes two terminals, namely the first terminal (104 of FIG. 2 or 204 of FIG. 4) and one of second and third terminals (103 or 105 of FIG. 2, or 203 or 205 of FIG. 3), connected together via the first connection member (1061 of FIG. 2 or $207_2$ of FIG. 4) of the first board ($100_1$ of FIG. 2 or $201_2$ of FIG. 4), the second connection member ($107_2$ of FIG. 2 or $206_1$ of FIG. 4) of the second board ($100_2$ of FIG. 2 or $200_1$ of FIG. 4) and the first connection circuit ($108_2$ of FIG. 2 or 2081 of FIG. 4) of the second board ($100_2$ of FIG. 2 or $200_1$ of FIG. 4). The function of the semiconductor device ($101_1$ of FIG. 2 or $201_2$ of FIG. 4) of the first board ($101_1$ of FIG. 2 or $201_2$ of FIG. 4) may thus be set in correspondence with the first or second value supplied to the first terminal from the second or third terminal (103, 105 of FIG. 2 or 203, 205 of FIG. 4) to which the first terminal (104 of FIG. 2 or 204 of FIG. 4) is connected.

In one of preferred modes, there is provided a control board (111 of FIG. 2) that includes a control device (for example a microcomputer 2 of FIG. 2), to which the semiconductor devices on the first and second boards are connected in series and which is configured to control the semiconductor devices on the first and second boards. The control board includes a second connection member ($107_4$ of FIG. 2) connected to the first connection member ($106_3$ of FIG. 2) of the first or second board that is neighbored to the control board (111 of FIG. 2). The second connection member ($107_4$ of FIG. 2) of the control board (111 of FIG. 2) is connected to two terminals, namely the first terminal (104 of FIG. 2) and one of the second and third terminals (103 or 105 of FIG. 2) of the semiconductor device of the board ($100_3$ of FIG. 2) neighboring to the control board (111 of FIG. 2). The control board (111 of FIG. 2) may further include a connection circuit (third connection circuit) ($108_4$ of FIG. 2) that connects the above mentioned two terminals to which the second connection member ($107_4$ of FIG. 2) is connected.

In one of preferred modes, there is provided a configuration in which the semiconductor devices on the first and second boards are connected in series, and in which there is provided a third connection member (212 of FIG. 4) connected to a first connection member ($207_1$ of FIG. 4) of the board arranged at an end (for example, $200_1$ of FIG. 4) out of the first or second board. The third connection member (212 of FIG. 4) is adapted to be connected to two terminals, namely the first terminal (for example, 204 of FIG. 4) and one of the second and third terminals (for example 203 or 205 of FIG. 4) of the semiconductor device (for example $201_1$ of FIG. 4) of the board arranged at the end (for example, $200_1$ of FIG. 4). The third connection member (212 of FIG. 4) may further include a connection circuit (fourth connection circuit) (213 of FIG. 4) that connects those two terminals together in the third connection member (212 of FIG. 4).

Figure 6:
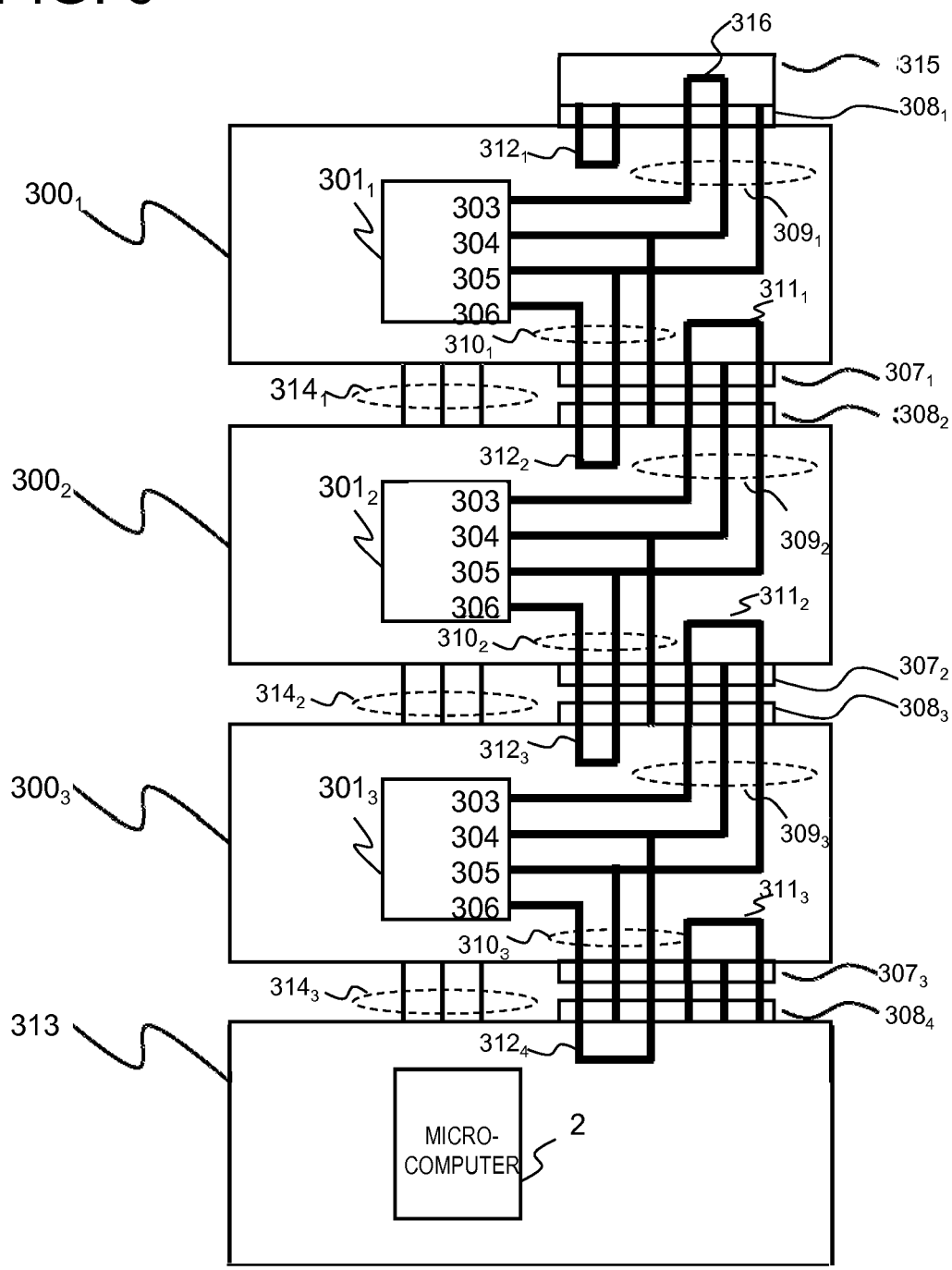
FIG. 6 is a diagram illustrating a connection example of the exemplary embodiment 3 according to the present invention.
Figure 7:
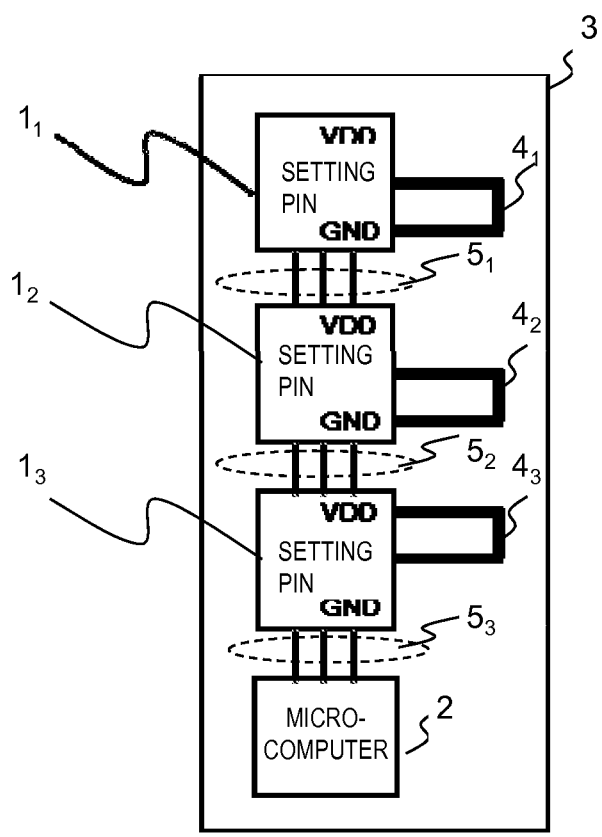
FIG. 7 illustrates a related technique 1.
Figure 8:
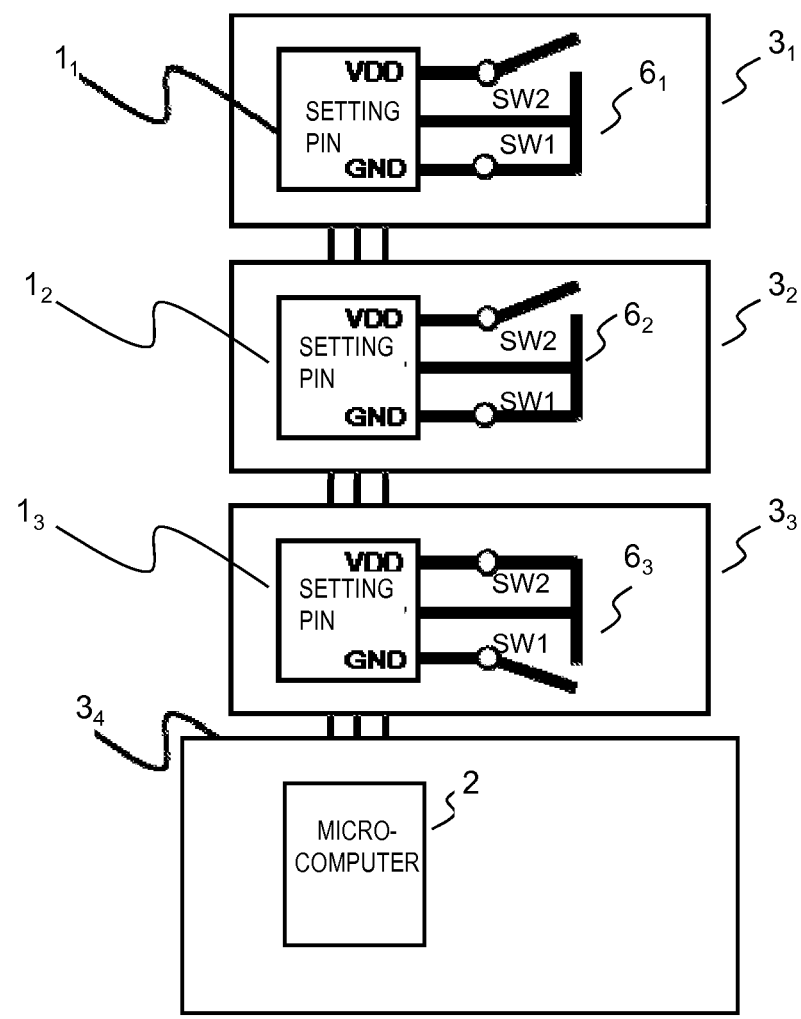
FIG. 8 illustrates a related technique 2.
Figure 9:
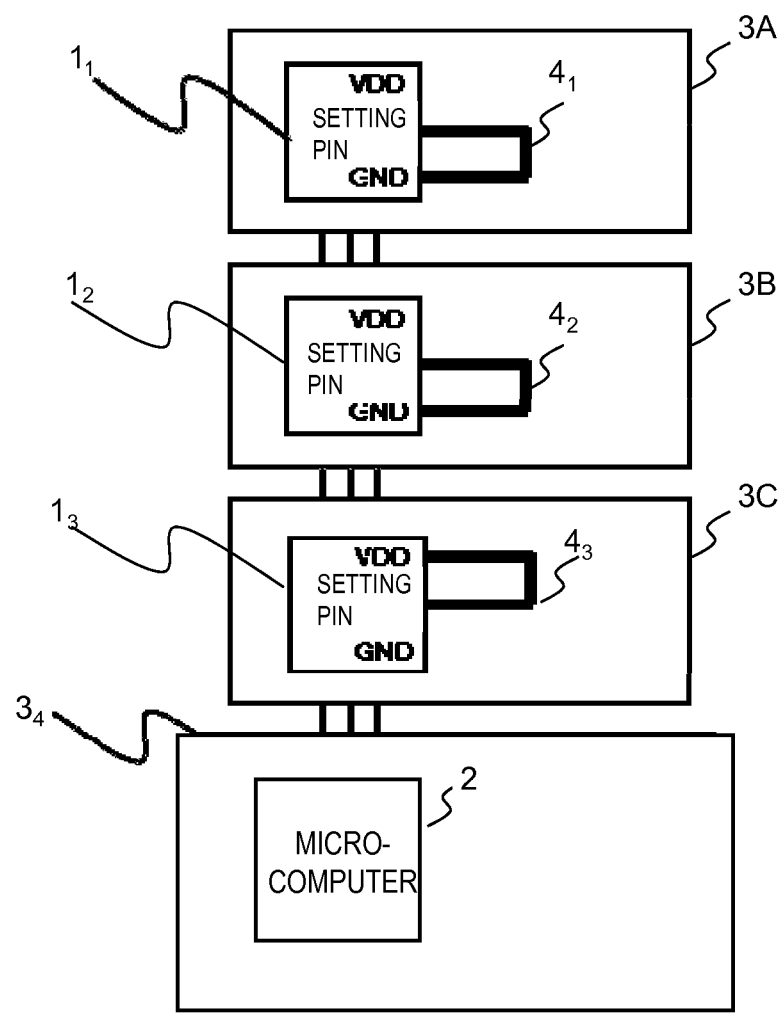
FIG. 9 illustrates the related technique 2.
Figure 10:
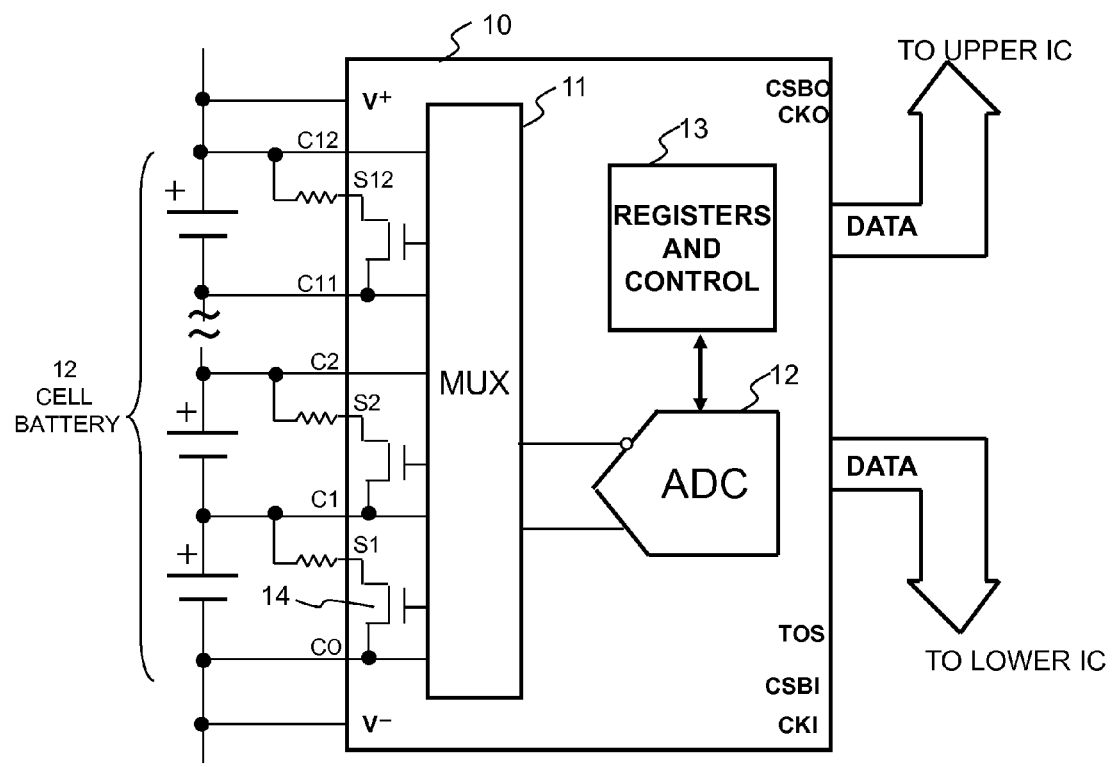
FIG. 10 illustrates a multi cell battery stack monitor IC.

In still another preferred mode of the present invention, there are provided at least first to third boards (for example, $300_2$, $300_3$, $300_1$ of FIG. 6). The second and third boards are arranged on both sides of the first board. The first terminal (306 of FIG. 6) and the second or third terminal (305 or 304 of FIG. 6) of the semiconductor device ($301_2$ of FIG. 6) of the first board (for example, $300_2$ of FIG. 6), totaling at two terminals, may be connected together via the first connection member ($307_2$ of FIG. 6) of the first board ($300_2$ of FIG. 6), the second connection member ($308_3$ of FIG. 6) of the second board ($300_3$ of FIG. 6) and the first connection circuit ($312_3$ of FIG. 6) of the second board ($300_3$ of FIG. 6). Also, the fourth terminal (303 of FIG. 6) and the second or third terminal (305 or 304 of FIG. 6) of the semiconductor device ($301_2$ of FIG. 6) of the first board ($300_2$ of FIG. 6), totaling at two terminals, may be connected together via the second connection member ($308_2$ of FIG. 6) of the first board ($300_2$ of FIG. 6), the first connection member ($307_1$ of FIG. 6) of the third board ($300_2$ of FIG. 6) and by the second connection circuit ($311_1$ of FIG. 6) of the third board ($300_1$ of FIG. 6). The function of the semiconductor device ($301_2$ of FIG. 6) of the first board ($300_2$ of FIG. 6) may be set in correspondence with the combination of the first or second value supplied to the first terminal (306 of FIG. 6) from the second or third terminal (305 or 304 of FIG. 6) to which the first terminal (306 of FIG. 6) is connected, and the first or second value supplied to the fourth terminal (303 of FIG. 6) from the second or third terminal (305 or 304 of FIG. 6) to which the fourth terminal (303 of FIG. 6) is connected.

In one of preferred modes, there is provided in which the semiconductor devices ($301_2$, and $301_3$ of FIG. 6) of the first and second boards (for example, $300_2$, and $300_3$ of FIG. 6) are connected in series and in which there is provided a control board (313 of FIG. 6) that includes a control device (2 of FIG. 6) configured to control the semiconductor devices ($301_2$ and $301_3$ of FIG. 6) of the first and second boards ($300_2$ and $300_3$ of FIG. 6). The control board (313 of FIG. 6) may include a second connection member ($308_4$ of FIG. 6) connected to the first connection member ($307_3$ of FIG. 6) of the board ($300_3$ of FIG. 6), out of the first and second boards ($300_2$ and $300_3$ of FIG. 6), which is neighboring to the control board (313 of FIG. 6). The second connection member ($308_4$ of FIG. 6) of the control board (313 of FIG. 6) is connected to two terminals, namely the first terminal (306 of FIG. 6) and the second or third terminal (305 or 304 of FIG. 6) of the semiconductor device ($301_3$ of FIG. 6) of the board ($300_3$ of FIG. 6) neighboring to the control board (313 of FIG. 6). The control board (313 of FIG. 6) may further include a connection circuit (fifth connection circuit) ($312_4$ of FIG. 6) that connects together the two terminals, connected by the second connection member ($308_4$ of FIG. 6), in the control board (313 of FIG. 6).

In one of preferred modes, the present invention provides a configuration in which the semiconductor devices (for example, $301_2$, $301_3$, and $301_1$ of FIG. 6) of first to third boards (for example, $300_2$, $300_3$, and $300_1$ of FIG. 6), are connected in series, and in which a third connection member (connector for termination 315 of FIG. 6) is connected to the second connection member ($308_1$ of FIG. 6) of the board arranged at an end (for example, $300_1$ of FIG. 6) out of the first to third boards ($300_2$, $300_3$, and $300_1$ of FIG. 6). The third connection member (315 of FIG. 6) may be connected to two terminals, namely the fourth terminal (303 of FIG. 6) and the second or third terminal (305 or 304 of FIG. 6) of the semiconductor device ($301_1$ of FIG. 6) of the board ($300_1$ of FIG. 6) arranged at the end. The third connection member (315 of FIG. 6) may include a connection circuit (sixth connection circuit) (316 of FIG. 6) that connects the two terminals together in the third connection member (315 of FIG. 6).

According to the present invention, the functions of the ICs mounted on the boards can be set by relation of the boards connected, there being no need to change peripheral circuit depending on the function of each of the ICs stacked. Thus, it is possible to accomplish circuit standardization, as a result of which it is possible to reduce the number of design processes as well as a fabrication cost. Moreover, according to the present invention, the function of the IC may automatically be set simply by connecting boards, each having an IC mounted. It is therefore unnecessary to perform additional operations following the connection of the boards to render it possible to reduce a possibility of malfunction caused by mistaken setting. In addition, the number of the ICs stacked together may be increased or decreased with ease. The following describes exemplary embodiments of the present invention.

<Exemplary Embodiment 1>

FIG. 1 illustrates an example configuration of a board (circuit board) according to an exemplary embodiment 1 of the present invention. Referring to FIG. 1, an IC 101 is mounted in a board 100. A connector 106 (a first connection member) and a connector 107 (a second connection member) are provided at opposite locations of two opposite sides of the board 10. The IC 101 includes a master slave setting pin 104, a VDD (power supply voltage) pin 103 and a ground (GND) pin 105. In the case wherein the master slave setting pin 104 is connected to the VDD pin 103, the functionality of IC 101 is set to that of the master, whereas, in the case wherein the master slave setting pin 104 is connected to the GND pin 105, the functionality of IC 101 is set to that of the slave.

In the board 100, the GND pin 105, master slave setting pin 104 and the VDD pin 103 are respectively connected via wirings 102A, 102B and 102C on the board 100 to terminals 106A, 106B and 106C of the connector 106. The connector 107 has its terminals 107A and 107B arranged at locations that correspond respectively to the terminals 106A and 106B of the opposing connector 106. The terminals 107A and 107B of the connector 107 are connected together via a circuit (wiring) 108 provided on the board 100. By the way, a reference number 107C shown in the connector 107 represents a location that corresponds to the location of the terminal 106C of the connector 106. It is noted that, if a terminal, such as a pin, is provided at a location of 107C, such terminal or pin is unconnected (open), with respect to the circuit provided on the board 100, and hence no terminal or pin needs to be provided at the location of 107C (It does not matter whether such terminal or pin is actually provided). If the connector 107 is provided with a receptacle (terminal), such a receptacle that holds a pin that is connected to the connector 107, may be provided at a location indicated by 107c.

Figure 2:
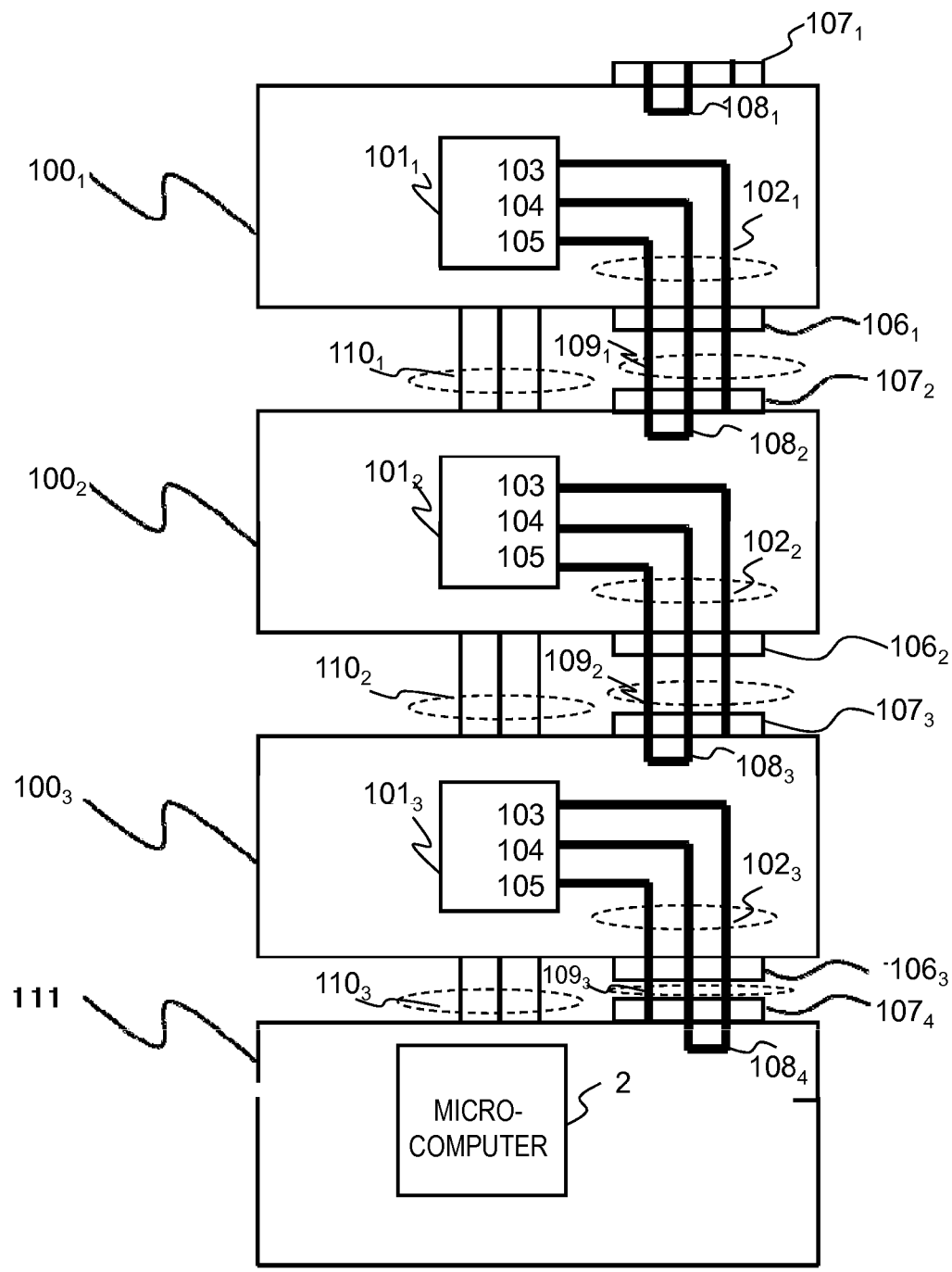
FIG. 2 is a diagram illustrating a connection example of the exemplary embodiment 1 according to the present invention.

FIG. 2 illustrates an example configuration (a board system) including a plurality of the boards 100 which are connected to a control board 111. Referring to FIG. 2, each of boards $100_1$ to $100_3$ is of the same configuration as the board 100 shown in FIG. 1. It is noted that, even though a configuration in which there are provided the control board 111 and three boards 100 is discolored in FIG. 2, the number of the boards 100 may, of course, not necessarily be three. The same may be said of the configurations shown in FIG. 4 and in FIG. 6 which will be described later.

Referring to FIG. 2, in connecting the boards $100_1$ and $100_3$ to stack ICs $101_1$ and $101_2$ together, the terminals of a connector $106_1$ of the board $100_1$ are connected to the mating terminals of a connector $107_2$ of the board $100_2$ by a set of cables $109_1$. In the configuration of FIG. 2, the three terminals (106A to 106C of FIG. 1) are connected to the three terminals (107A to 107C of FIG. 1) of the connector $107_2$ of the board $100_2$. A terminal (107C of FIG. 1) of the connector $107_2$ of the board $100_2$ and a corresponding terminal (106C of FIG. 1) of the connector $106_1$ may be left unconnected.

The master slave setting pin 104 and the GND pin 105 of the board $100_1$ are connected together via the connector $106_1$ of the board 101, set of cables $109_1$, connector $107_2$ of the board $100_2$ and a circuit (connection circuit) provided on the board $100_2$. By connecting the connector $106_1$ of the board $100_1$ and the connector $107_2$ of the board $100_2$, the IC $101_1$ of the board $100_1$ is set to a slave function.

Furthermore, by connecting a connector $106_2$ of the board $100_2$ to a connector $107_3$ of the board $100_3$, the master slave setting pin 104 and the GND pin 105 of the IC $101_2$ of the board $100_2$ are connected together via the connector $106_2$ of the board $100_2$ and a circuit $108_3$ on the board $100_3$. Hence, the IC $101_2$ of the board $100_2$ is set to a slave function.

The control board 111 includes a microcomputer 2 that performs communication with the ICs $101_1$ to $101_2$ mounted on the boards $100_1$ to $100_3$ to control transmission of commands, data collection and the like. The control board 111 also includes a connector $107_4$ on a side thereof facing a neighboring board $100_3$ so that the connector will correspond to a connector $106_3$ of the board $100_3$. Two of terminals in the connector $107_4$ are connected together via a circuit (connection circuit) $108_4$, (which is a wiring) provided on the control board 111.

To connect the board $100_3$ and the control board 111 together, the connector $106_3$ of the board $100_3$ is connected via a set of cables $109_3$ to the connector $107_4$ of the control board 111. The connector $107_4$ of the control board 111 has its terminals connected such that the master slave setting pin 104 and the VDD pin 103 of the IC $101_3$ of the board $100_3$ are connected together, via the connector $106_3$ of the board $100_3$, set of cables $109_3$, connector $107_4$ of the control board 111 and the circuit $108_4$ arranged on the control board 111. It is noted that the connector $107_4$ provided on the control board 111, corresponds to a configuration in which a terminal at a location of 107C in the connector 107 of FIG. 1 is connected to the terminal 107B by a circuit 108 ($108_4$). The control board 111 on which there is mounted the microcomputer 2 that is configured to control the ICs $101_1$ to $101_3$, has a configuration different from the boards $100_1$ to $100_3$. However, the configuration of the connector $107_4$ and the circuit $108_4$ each corresponds to that of the connector 107 and the circuit 108 of the board 100 shown in FIG. 1.

By connecting the connector $106_3$ of the board $100_3$ and the connector $107_4$ of the control board 111 together, the functionality of the IC $101_3$, provided on the board $100_3$, is set to that of a master (the function to directly connect to the microcomputer 2).

In the board $100_1$ arranged on an end, the terminals of a connector $107_1$, disposed on a side of the board opposite to its side facing the neighboring board $100_2$, are left open, because the connector lacks a counterpart connector to which the connector is to be connected.

The above described exemplary embodiment uses the sets of cables 109 to wiring the connectors 106 and 107 of the neighboring boards facing each other. However, the neighboring boards may also be connected by means other than the cables. For example, a card edge connector may also be used for connecting the neighboring boards. Or, the connector 106 may be provided with a through-pin which may fit to a receptacle of the counterpart connector 107. In this case, receptacles of the connectors 107A to 107C of the connector 107 are provided in association with pins of the terminals 106A to 106C of the connector 106 of the counterpart board. If the circuit configuration is the same from one board to another and the neighboring boards are connectable by any other means, the configuration of connection between the neighboring boards is not limited to the connection making use of the connectors. That is, it may not be strictly necessary to provide the connectors.

In the exemplary embodiment 1, function setting of the IC 101 (setting of the master function or the slave function) can be carried out in accordance with connection of the boards, so that, in the exemplary embodiment 1, it is unnecessary to modify a circuit or change over a switch in correspondence with the IC function to render it possible to reduce the number of design processes as well as costs.

Moreover, in the exemplary embodiment 1, the number of ICs stacked together may be changed by simply increasing or decreasing the number of the boards to be connected. If, for example, the IC is a battery monitor IC, the number of serially connected cells (batteries) to be monitored can be freely changed (adapted for scalability).

<Exemplary Embodiment 2>

The following describes an exemplary embodiment 2 of the present invention. FIG. 3 illustrates a board (circuit board) 200 according to the exemplary embodiment 2. Referring to FIG. 3, an IC 201 configured to be stacked is mounted in the board 200, and connectors 206, and 207 are connected on two opposite sides of the board 200 so that the connectors will correspond to each other. The IC 201 includes a top setting pin 204, a VDD pin 203 and a GND pin 205. If the top setting pin 204 is connected to the VDD pin 203, the IC 201 is set to the top. If the top setting pin 204 is connected to the GND pin 205, the function of the IC 201 is set to the non-top. It is noted that the top is such function that is set in the IC remotest from the microcomputer, that is, in the IC monitoring a battery of the highest potential in case the IC is a multi cell battery monitor IC and three such ICs are stacked together. Since the remotest IC represents the final stage of a daisy chain connection, such that there lacks no subsequent stage IC, it is unnecessary for the remotest IC to further transfer data transmitted from the microcomputer.

The VDD pin 203, top setting pin 204 and GND pin 205 of the IC 201 are respectively connected via wirings 202A, 202B and 202C of the board 200 to terminals 207A, 207B and 207C of the connector 207. The terminals 206 and 206C of the connector 206 that are respectively opposed to the terminals 207B and 207C of the connector 207, are connected by a circuit (connection circuit) 208 on the board 200. There is no need to provide a terminal (connection terminal) at a location indicated by a reference number 206A of the connector 206 since such a terminal, if provided, remains unconnected with respect to the circuit provided on the board 200. However, when the connector 206 is provided with a receptacle, a receptacle (connection terminal) may be well provided on accommodate a pin for connection at a location indicated by a reference number 206A.

Figure 4:
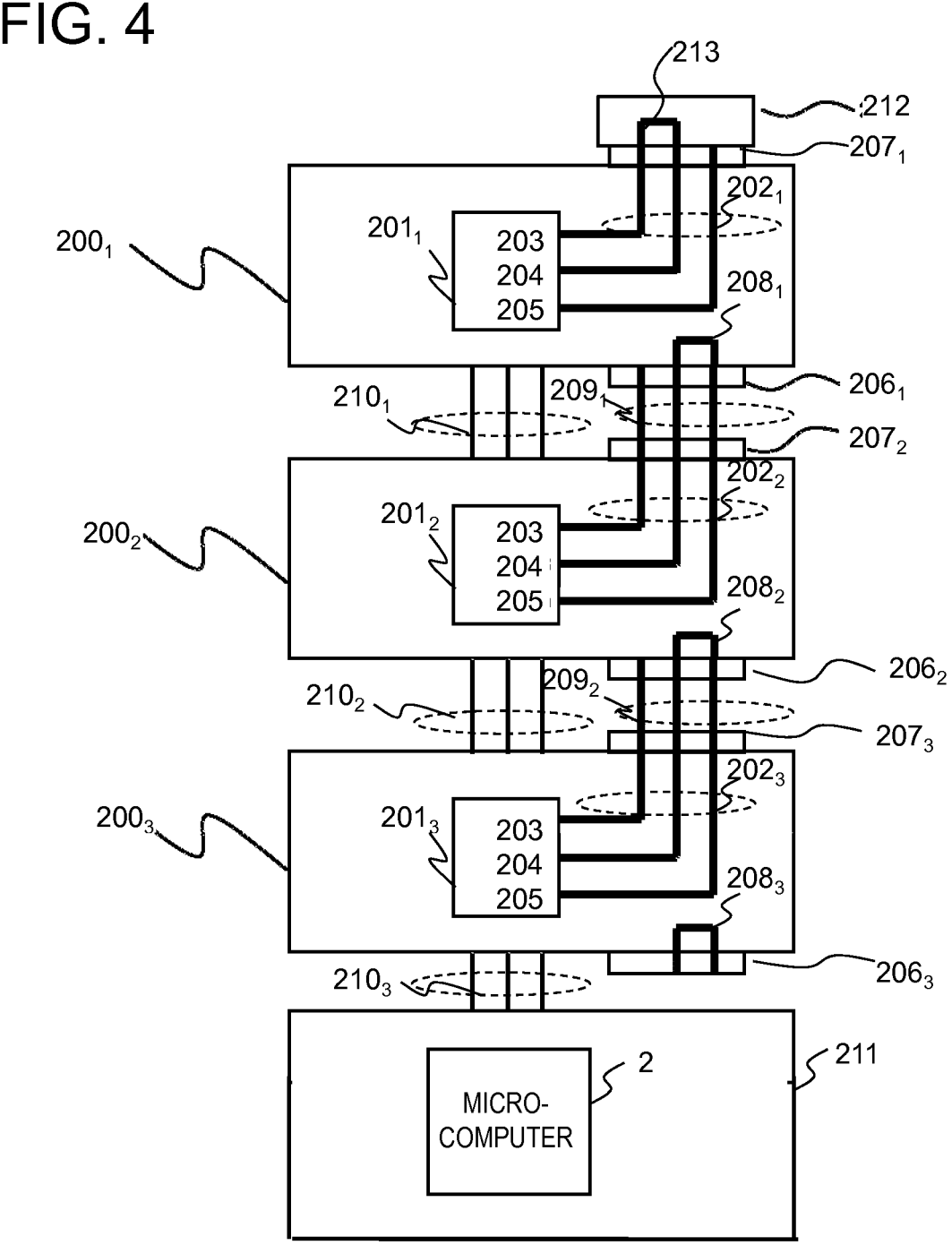
FIG. 4 is a diagram illustrating a connection example of the exemplary embodiment 2 according to the present invention.

FIG. 4 illustrates an example connection configuration (board system) in which there are provided a plurality of boards $200_1$ to $200_3$, a connector for termination 212 and a control board 211. It is noted that each of the boards $200_1$ to $200_3$ is the same as the board 200 shown in FIG. 3.

Referring to FIG. 4, when the boards $200_1$ and $200_2$ are connected together to stack the ICs $201_1$ and $201_2$ together, mating terminals of a connector $206_1$ of the board $200_1$ and a connector $207_2$ of the board $200_2$ are connected together using, for example, a set of cables $209_1$. In this case, the top setting pin 204 and the GND pin 205 of the IC $201_2$ are connected together via a wiring $202_2$, a connector $207_2$, a set of cables $209_1$, a connector $206_1$ and a circuit $208_1$ on the board $200_1$. By connecting the connector $207_2$ of the board $200_2$ to the connector $206_1$ of the board $200_1$, in this manner, the functionality of the IC $210_2$ of the board $200_2$ is set to a non-top.

In the example configuration of FIG. 4, the three terminals (206A to 206C of FIG. 3) of the connector $206_1$ of the board $200_1$ are connected to three terminals (207A to 207C of FIG. 3) of the connector $207_2$ of the board $200_2$. In connecting the connectors $206_1$ and $207_2$ together, one terminal of the connector $206_1$ (206A of FIG. 3) and the corresponding terminal (207A of FIG. 3) of the connector $207_2$ may be left unconnected.

By further connecting a connector $206_3$ of the board $200_3$ to the connector $206_2$ of the board $200_2$, the top setting pin 204 and the GND pin 205 of an IC $201_3$ of the board $200_3$ are connected together via a wiring $202_3$, a connector $207_3$, a set of cables $209_2$, a connector $206_2$ of the board $200_2$ and a circuit $208_2$ provided on the board $200_2$. Thus, the function of an IC $201_3$ of the board $200_3$ is set to the non-top.

The connector for termination 212, connected to the board $200_1$, is obtained on connecting two terminals of the connector $207_1$ (terminals 207A and 207B of the connector 207 of FIG. 3) by the circuit (connection circuit) 213 (which is a wiring).

When the connector for termination 212 is connected to the connector $207_1$ of the board $200_1$, the top setting pin 204 and the VDD pin 203 of the IC $201_1$ are connected together via a wiring $202_1$, the connector $207_1$, the connector for termination 212 and the circuit (connection circuit) 213.

By connecting the connector for termination 212 to the connector $207_1$ of the board $200_1$ arranged at an end, the function of the IC $201_1$ is set to top. In the exemplary embodiment 2, as in the exemplary embodiment 1, the connection between boards, as a matter of course, is not limited to a set of cables 209. The connection between boards is not also limited to connection using a connector.

In the exemplary embodiment 2, the top function of the IC, mounted on the board, are automatically set depending on the connector for termination and the boards connected together. As a result, circuit changes or switch changeover in accordance with an IC function is unneeded to render it possible to reduce the number of design processes as well as costs. For example, if the IC is a battery monitor IC, the number of the serially connected cells (batteries) to be monitored may be changed freely (adapted for scalability).

<Exemplary Embodiment 3>

Figure 5:
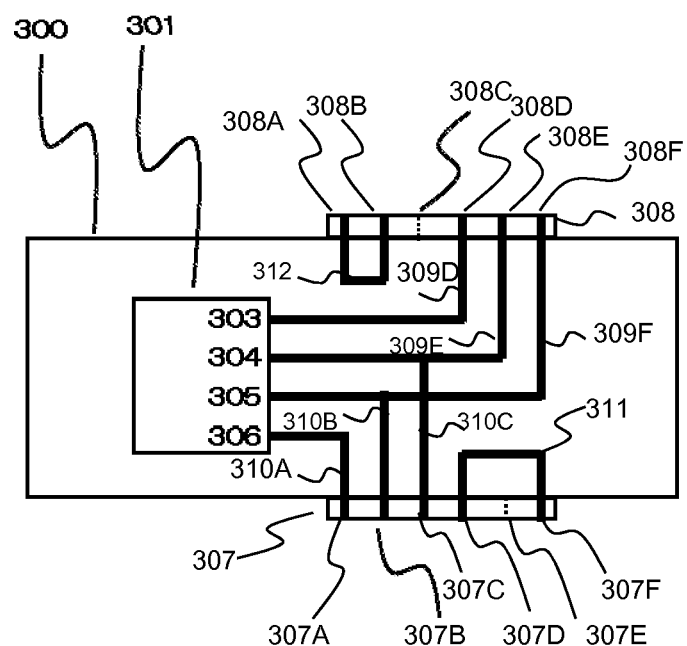
FIG. 5 is a diagram illustrating an exemplary embodiment 3 according to the present invention.

An exemplary embodiment 3 according to the present invention will now be described. FIG. 5 illustrates a board (circuit board) 300 of the exemplary embodiment 2. Referring to FIG. 5, an IC 301 is mounted in the board 300 and connectors 307 and 308 are connected to both opposite sides of the board 300 at opposing positions. The IC 301 includes a master slave setting pin 306, a top setting pin 303, a VDD pin 304 and a GND pin 305. When the master slave setting pin 306 is connected to the VDD pin 304, the function of the IC 301 is set to a master, whereas, when the master slave setting pin is connected to the GND pin 305, the function of the IC is set to a slave. When the top setting pin 303 of the IC 301 is set to the VDD pin 304, the function of the IC 301 is set to the top, whereas, when the top setting pin is set to GND pin 305, the function of the IC is set to the non-top. Each of the connectors 307 and 308 includes five terminals. When a terminal, such as a pin, is provided at a location of the connector 307 or 308 indicated by a reference number 307E or 308C of the connector 307 or 308, such terminal is left unconnected, so that there is no need to provide terminals, such as connector pins, at such locations. However, if any of the connectors 307 and 308 includes a receptacle, such receptacle may be provided at the locations 307E or 308C for accommodating mating connection pins.

The master slave setting pin 306, GND pin 305 and VDD pin 304 of the IC 301 are respectively connected via wirings 310A, 310B and 310C to terminals 307A, 307B, 307C of the connector 307. The connector 307 also has terminals 307D and 307F that are connected together by a circuit (connection circuit) 311 provided on the board 300. The top setting pin 303, VDD pin 304 and GND pin 305 of the IC 301 are respectively connected, via wirings 309D, 309E, 309F, to pins 308D, 308E, and 308F of the connector 308. The connector 308 also includes pins 308A, and 308B connected via circuit 312 (wiring) provided on the board 300.

FIG. 6 illustrates an example connection configuration (board system) in which there are provided a plurality of boards $300_1$ to $300_3$, each of which is the same as the board 300 of FIG. 5, a control board 313 and a connector for termination 315. Referring to FIG. 6, in connecting the boards $300_1$ and $300_2$ to stack ICs $301_1$ and $301_2$ together, opposing connectors $307_1$, and $308_2$ are connected by a set of cables, not shown. In this case, the master slave setting pin 306 and the GND pin 305, provided on the IC $301_1$ of the board $300_1$, are connected via a wiring $310_1$, the connector $307_1$, the connector $308_2$ and a circuit (wiring) $312_2$ provided on the board $300_1$. By connecting the connector $308_2$ on the board $300_2$ to the connector $307_1$ on the board $300_1$, in this manner, the IC $310_1$ on the board $300_1$ is set to the slave function.

In the configuration shown in FIG. 6, six terminals (307A to 306F of FIG. 5) of the connector $307_1$ on the board $300_1$ are connected, via six sets of cables, to six terminals (308A to 308F of FIG. 5) of the connector $308_2$ of the board $300_2$. In connecting the connectors $307_1$ and $308_2$, the terminal of the connector $307_1$ (307C of FIG. 5) may be left unconnected with respect to the mating terminal (308C of FIG. 5) of the connector $308_2$.

The top setting pin 303 and the VDD pin 304 of the IC $310_1$ on the board $300_1$ are connected, via a wiring $309_1$ on the board $300_1$, a connector $308_1$ on the board $300_1$, the connector for termination 315 and a circuit (wiring) 316. By connecting the connector for termination 315 to the connector $308_1$ of the board $300_1$, in this manner, the IC$301_1$ of the board $300_1$ is set to the top function.

The master slave setting pin 306 and the GND pin 305 of an IC $301_2$ on the board $300_2$ are connected together via a wiring $310_2$ on the board $300_2$, a connector $370_2$ on the board $300_2$, a connector $308_3$ and a circuit (wiring) $312_3$ provided on the board $300_3$. By connecting the connector $308_3$ of the board $300_3$ to the connector $307_2$ of the board $300_2$, in this manner, the IC $301_2$ of the board $300_2$ is set to the slave function.

The top setting pin 303 and the GND pin 305 of the IC $301_2$ on the board $300_2$ are connected together via a wiring $309_2$ on the board 3002, connector $308_2$ on the board $300_2$, the connector $307_1$ of the board $300_1$ and a circuit (wiring) $311_1$ provided on the board $300_1$. By connecting the connector $307_1$ of the board $300_1$ to the connector $308_2$ of the board $300_2$, the IC$301_2$ of the board $300_2$ is set to the non-top functions.

The master slave setting pin 306 and the VDD pin 304 of the IC $301_3$ on the board $300_3$ are connected together by a wiring $310_3$ on the board $300_3$, a connector $307_3$ of the board $300_3$, a connector $308_4$ of the control board 313 and via a circuit (wiring) $312_4$ provided on the control board 313. By connecting the connector $308_4$ of the control board 313 to the connector $307_3$ of the board $300_3$, in this manner, the IC $301_3$ of the board $300_3$ is set to the master function.

The top setting pin 303 and the GND pin 305 on the board $300_3$ are connected together via a wiring $309_3$ on the board $300_3$, a connector $308_3$ of the board $300_3$, connector $307_2$ of the board $300_2$ and a circuit (wiring) $311_2$ provided on the board $300_2$. By connecting the connector $308_3$ of the board $300_3$ and the connector $307_2$ of the board $300_2$, in this manner, the IC $301_3$ of the board $300_3$ is set to the non-top function. It is noted that, although the connectors of the boards are connected by cables, the connection between boards may be made by means other than cable connection. The connection between the boards is also not limited to the cable connection.

In the exemplary embodiment 3, the master slave function as well as the top function of the ICs, mounted on the boards, may be set automatically at the same time depending on connection of the boards and the connector for termination. The number of the ICs stacked may be changed by increasing or decreasing the number of the boards connected together. If, for example, the IC is a battery monitor IC, the number of serially connected cells (batteries) to be monitored can be freely changed (adapted for scalability).

It is noted that the ICs, explained in the above described exemplary embodiments, may not only be applied to advantage for a multi cell battery stack monitor IC, but also may be used for setting various functions for ICs that may be stacked together.

The disclosures of the above mentioned Patent and Non-Patent Literatures are to be incorporated herein by reference. The exemplary embodiments or Examples may be modified or adjusted within the concept of the total disclosures of the present invention, inclusive of claims, based on the fundamental technical concept of the invention. A series of combinations or selections of elements herein disclosed (elements of claims, Examples and drawings) may be attempted within the context of the claims of the present invention. That is, the present invention may include a wide variety of changes or corrections that may occur to those skilled in the art in accordance with the total disclosures inclusive of the claims and the drawings as well as the technical concept of the invention.

The above mentioned exemplary embodiments may be summarized as follows, though not limited thereto:
(Supplementary Note 1)
A board comprising:
   a semiconductor device including:
     at least a first terminal to receive a signal that sets a functionality of the semiconductor device;
     a second terminal configured to supply a first value; and
     a third terminal configured to supply a second value, the semiconductor device adapted to be connected in series;
   a first connection member connected to the first to third terminals of the semiconductor device; and
   a second connection member adapted to be connected to the first connection member provided on a counterpart board, the second connection member including at least two terminals connected together via a first connection circuit,
   the first connection member of the board adapted to be connected to the second connection member provided on another counterpart board.
(Supplementary Note 2)
The board according to Supplementary Note 1, wherein the semiconductor device further includes
   a fourth terminal to receive a signal that sets the functionality of the semiconductor device, wherein
   the first connection member of the board is connected to the first to third terminals of the semiconductor device,
   the first connection member further including at least two terminals adapted to be connected to at least two terminals of the second connection member of the counterpart board,
   the at least two terminals of the first connection member being connected together by a second connection circuit, and wherein
   the second connection member of the board includes terminals connected respectively to the second, third and fourth terminals of the semiconductor device of the board, the terminals of the board being other than the at least two terminals connected together.
(Supplementary Note 3)
A board apparatus comprising:
   at least first and second boards, each being the board according to Supplementary Note 1, wherein
   two terminals that are the first terminal and one of the second and third terminals of the semiconductor device on the first board, are connected together via the first connection member of the first board, the second connection member of the second board and the first connection circuit, wherein
   the semiconductor device on the first board is set to a function corresponding to the first or second value supplied to the first terminal from the second or third terminal of the semiconductor device to which the first terminal is connected.

(Supplementary Note 4)

The board apparatus according to Supplementary Note 3, wherein the semiconductor devices on the first and second boards are connected in series, wherein the board apparatus further includes a control board including a control device to control the semiconductor devices on the first and second boards, the control board including a second connection member adapted to be connected to the first connection member of one of the first and second boards that is neighboring to the control board, the second connection member including at least two terminals connected together by a third connection circuit provided on the control board.

(Supplementary Note 5)

The board apparatus according to Supplementary Note 3, wherein the semiconductor devices on the first and second boards are connected in series, wherein the board apparatus further includes a third connection member adapted to be connected to the first connection member of the board arranged at an end out of the first and second boards, the third connection member including a fourth connection circuit configured to connect two terminals that are the first terminal and one of the second and third terminals of the semiconductor device of the board arranged at the end.

(Supplementary Note 6)

A board apparatus comprising first to third boards each of which is the board according to Supplementary Note 2; wherein two terminals that are the first terminal and one of the second and third terminals of the semiconductor device on the first board, are connected together via the first connection member of the second board, the second connection member of the second board and the first connection circuit of the second board, and two terminals that are the fourth terminal and one of the second and third terminals of the semiconductor device on the first board, are connected together via the second connection member of the third board, the first connection member of the third board and by the second connection circuit of the third board, wherein the functionality of the semiconductor device on the first board is set in correspondence with combination of the first or second value supplied to the first terminal from the second or third terminal of the semiconductor device to which the first terminal is connected, and the first or second value supplied to the fourth terminal from the second or third terminal of the semiconductor device to which the fourth terminal is connected.

(Supplementary Note 7)

The board apparatus according to Supplementary Note 6, wherein; the semiconductor devices on the first and second boards are connected in series, wherein the board apparatus further includes a control board including a control device to control the semiconductor devices on the first and second board, the control board including the second connection member connected to the first connection member of one of the first and second boards that is neighboring to the control board, the second connection member of the control board being connected to the first connection member of the board neighboring to the control board, the second connection member of the control board including at least two terminals connected together by a fifth connection circuit provide on the control board.

(Supplementary Note 8)

The board apparatus according to Supplementary Note 6 or 7, wherein the semiconductor devices on the first to third boards are connected in series, wherein the board apparatus further includes a third connection member connected to the second connection member of the board arranged at an end out of the first to third boards, the third connection member including a sixth connection circuit adapted to connect two terminals that are the fourth terminal and one of the second and third terminals of the semiconductor device of the board arranged at the end.

(Supplementary Note 9)

The board apparatus according to any one of modes 3 to 8, wherein the first and second connection members of each of the boards are arranged on two opposite sides of the board.

(Supplementary Note 10)

providing, in each of first to third boards, each board including a semiconductor device adapted for series connection, each semiconductor device including at least a first terminal to receive a signal that sets a function of the semiconductor device; a second terminal configured to supply a first value; and a third terminal configured to supply a second value, a first connection member connected to the first to third terminals of the semiconductor device; and a second connection member adapted to be connected to the first connection member of a counterpart board;

connecting at least two terminals of the second connection member on the board;

connecting the first connection member of the first board to the second connection member of the second board; and connecting the second connection member of the first board to the first connection member of the third board.

(Supplementary Note 11)

The method for board connection according to Supplementary Note 10, wherein the semiconductor device also includes a fourth terminal to receive a signal that sets the functionality of the semiconductor device, the first connection member of the board is connected to the first to third terminals of the semiconductor device and includes at least two terminals connected to at least two terminals of the second connection member of the counterpart board, the at least two terminals of the first connection member are connected by a second connection circuit, and wherein the second connection member of the board is connected to the second to fourth terminals of the semiconductor device of the board by terminals distinct from the at least two terminals connected together.

(Supplementary Note 12)

The method for board connection according to Supplementary Note 10, wherein two terminals that are the first terminal and one of the second and third terminals of the semiconductor device on the first board, are connected by the first connection member of the first board, the second connection member of the second board and the first connection circuit, and wherein the semiconductor device on the first board is set to a function corresponding to the first or second value delivered from the second or third terminal of the semiconductor device to the first terminal thereof connected to the second or third terminal.

(Supplementary Note 13)

The method for board connection according to Supplementary Note 12, wherein the semiconductor devices on the first and second boards are connected in series, a control board having a control device to control the semiconductor devices on the first and second boards is provided, the control board includes the second connection member connecting to the first connection member of one of the first and second boards that is neighboring to the control board, and wherein at least two terminals of the second connection member are connected together by a third connection circuit provided on the control board.

(Supplementary Note 14)

The method for board connection according to Supplementary Note 12, wherein, the semiconductor devices on the first and second boards are connected in series, a third connection member connecting to the first connection member of one of the first and second boards that is arranged at an end is provided, and wherein the third connection member includes a fourth connection circuit connecting together two terminals that are the first terminal and one of the second and third terminals of the semiconductor device of the board arranged at the end.

(Supplementary Note 15)

The method for board connection according to Supplementary Note 11, wherein, two terminals that are the first terminal and one of the second and third terminals of the semiconductor device on the first board, are connected together by the first connection member of the second board, the second connection member of the second board and by the first connection circuit of the second board, two terminals that are the fourth terminal and one of the second and third terminals of the semiconductor device on the first board, are connected together by the second connection member of the third board, the first connection member of the third board and by the second connection circuit of the third board, and wherein, the functionality of the semiconductor device on the first board is set in correspondence with the combination of the first or second value delivered from the second or third terminal to the first terminal of the semiconductor device, the second or third terminal is connected to, and the first or second value delivered from the second or third terminal to the fourth terminal of the semiconductor device, the second or third terminal is connected to.

(Supplementary Note 16)

The method for board connection according to Supplementary Note 15, wherein, the semiconductor devices on the first and second boards are connected in series, a control board having a control device to control the semiconductor devices on the first and second boards is provided, the control board includes the second connection member connecting the control board to the first connection member of one of the first and second boards that is neighboring to the control board, the second connection member of the control board is connected to the first connection member of the board neighboring to the control board, and wherein at least two terminals of the second connection member of the control board are connected together by a fifth connection circuit of the control board.

(Supplementary Note 17)

The board apparatus according to Supplementary Note 15 or 16, wherein, the semiconductor devices on the first to third boards are connected in series, a third connection member connected to the first connection member of the board out of the first to third boards that is arranged at an end is provided, and wherein the third connection member includes a sixth connection circuit connecting together two terminals that are the fourth terminal and one of the second and third terminals of the semiconductor device of the board arranged at an end.

(Supplementary Note 18)

The board apparatus according to any one of modes 12 to 17, wherein, the first and second connection members of each of the boards are arranged on two opposite sides of the board.

What is claimed is:

1. A board comprising:
    a semiconductor device including:
    at least a first terminal to receive a signal that sets a functionality of the semiconductor device;
    a second terminal configured to supply a signal of a first value; and
    a third terminal configured to supply a signal of a second value, the semiconductor device adapted to be connected in series;
    a first connection member including three terminals connected respectively to the first to third terminals of the semiconductor device;
    a second connection member adapted to be connected to the first connection member provided on a counterpart board; and
    a first connection circuit to connect at least two terminals of the second connection member together,
    the first connection member of the board adapted to be connected to the second connection member provided on another counterpart board.

2. The board according to claim 1, wherein the semiconductor device further includes
    a fourth terminal to receive a signal that sets a functionality of the semiconductor device, wherein
    the first connection member of the board includes three terminals connected respectively to the first to third terminals of the semiconductor device,
    the first connection member further including
    at least another two terminals adapted to be connected respectively to at least two terminals of the second connection member of the counterpart board, wherein
    the board further includes
    a second connection circuit to connect the at least another two terminals of the first connection member together, and wherein
    the second connection member of the board includes terminals connected respectively to the second, third and fourth terminals of the semiconductor device of the board, the terminals of the board being other than the at least two terminals connected together.

3. The board apparatus comprising:
    at least first and second boards, each being the board according to claim 1, wherein
    two terminals that are the first terminal and one of the second and third terminals of the semiconductor device on the first board, are connected together via the first connection member of the first board, the second connection member of the second board and the first connection circuit of the second board, the semiconductor device on the first board being set to a function corresponding to the first or second value supplied to the first terminal from the second or third terminal of the semiconductor device to which the first terminal is connected.

4. The board apparatus according to claim 3, wherein the semiconductor devices on the first and second boards are connected in series, wherein the board apparatus further includes
a control board including:
a control device to control the semiconductor devices on the first and second boards;
a second connection member adapted to be connected to the first connection member of one of the first and second boards that is neighboring to the control board; and
a third connection circuit to connect at least two terminals of the second connection member together.

5. The board apparatus according to claim 3, wherein the semiconductor devices on the first and second boards are connected in series, wherein the board apparatus further includes
a third connection member adapted to be connected to the first connection member of the board arranged at an end out of the first and second boards,
the third connection member including
a fourth connection circuit configured to connect two terminals together, the two terminals being the first terminal and one of the second and third terminals of the semiconductor device of the board arranged at the end.

6. The board apparatus comprising
first to third boards, each being the board according to claim 2, wherein
two terminals that are the first terminal and one of the second and third terminals of the semiconductor device on the first board, are connected together via the first connection member of the second board, the second connection member of the second board and the first connection circuit of the second board, and
two terminals that are the fourth terminal and one of the second and third terminals of the semiconductor device on the first board, are connected together via the second connection member of the third board, the first connection member of the third board and the second connection circuit of the third board, wherein
a functionality of the semiconductor device on the first board is set in correspondence with combination of the first or second value supplied to the first terminal from the second or third terminal of the semiconductor device to which the first terminal is connected, and the first or second value supplied to the fourth terminal from the second or third terminal of the semiconductor device to which the fourth terminal is connected.

7. The board apparatus according to claim 6, wherein the semiconductor devices on the first and second boards are connected in series, wherein
the board apparatus further includes
a control board including a control device to control the semiconductor devices on the first and second board,
the control board including
the second connection member connected to the first connection member of one of the first and second boards that is neighboring to the control board,
the second connection member of the control board being connected to the first connection member of the board neighboring to the control board,
the second connection member of the control board including at least two terminals connected together by a fifth connection circuit provide on the control board.

8. The board apparatus according to claim 6, wherein
the semiconductor devices on the first to third boards are connected in series, wherein
the board apparatus further includes
a third connection member connected to the second connection member of the board arranged at an end out of the first to third boards,
the third connection member including
a sixth connection circuit adapted to connect two terminals that are the fourth terminal and one of the second and third terminals of the semiconductor device of the board arranged at the end.

9. The board apparatus according to claim 3, wherein the first and second connection members of each of the boards are arranged on two opposite sides of the board.

10. A board connection method for an apparatus comprising
first to third boards, each board including
a semiconductor device adapted for series connection, each semiconductor device including at least a first terminal to receive a signal that sets a function of the semiconductor device, a second terminal configured to supply a first value, and a third terminal configured to supply a second value;
a first connection member including three terminals connected respectively to the first to third terminals of the semiconductor device; and
a second connection member adapted to be connected to the first connection member of a counterpart board, at least two terminals of the second connection member on each of the first to third boards being connected by a connection circuit provided on each of the first to third boards, the method comprising:
connecting the first connection member of the first board to the second connection member of the second board; and
connecting the second connection member of the first board to the first connection member of the third board.

* * * * *